United States Patent [19]

Netravali et al.

[11] Patent Number: 5,018,129

[45] Date of Patent: May 21, 1991

[54] DUAL RAIL DILATED SWITCHING NETWORKS

[75] Inventors: Arun N. Netravali, Westfield; Krishnan Padmanabhan, New Providence, both of N.J.

[73] Assignee: AT&T Bell Laboratories, Murray Hill, N.J.

[21] Appl. No.: 321,048

[22] Filed: Mar. 9, 1989

[51] Int. Cl.⁵ .............................................. H04J 14/00
[52] U.S. Cl. .......................................... 370/1; 370/60; 370/3; 455/601
[58] Field of Search ................... 370/1, 3, 60; 455/601

[56] References Cited

U.S. PATENT DOCUMENTS 4,894,818  1/1990  Fujioka et al. ........................... 370/1

OTHER PUBLICATIONS

"Dilated Networks for Photonic Switching," K. Padmanabhan and A. N. Netravali, IEEE Transactions on Communications, vol. Com-35, No. 12, Dec. 1987.

"On a Class of Multistage Interconnection Networks," C-L. Wu, and T-Y. Feng, IEEE Transactions on Computers, vol. C-29, No. 8, Aug. 1980.

*Primary Examiner*—Donnie L. Crosland
*Attorney, Agent, or Firm*—H. T. Brendzel

[57] ABSTRACT

A method for realizing, and a structure for implementing a switching network employing 2×2 switches. The network is dilated in that none of the 2×2 switches concurrently carry an active signal. The method for realizing such a network alters a given non-dilated network by replacing each 2×2 switch in the non-dilated network with a dual rail switch having a pair of 2×2 interconnected switches, and by replacing each link in the non-dilated network with a pair links. The final output of the dilated network is obtained by adding a combiner final stage which combines the pairs of signals to form output signals that parallel the output signals of the given non-dilated network.

8 Claims, 6 Drawing Sheets

BANYAN NETWORK

DILATED BANYAN NETWORK

MESH-CONNECTED CROSS BAR

DILATED MESH-CONNECTED CROSS BAR

DUAL RAIL DILATED SWITCHING NETWORKS

BACKGROUND OF THE INVENTION

This invention relates to optical switching networks and, more particularly, to optical switching network architectures that reduce crosstalk noise through judicious routing of signals.

Wideband optical signals can be switched with electronic control using electrooptic waveguide couplers using $TiLiNbO_3$ waveguides on a planar $LiNbO_3$ crystal. The basic switching element is a coupler with two active inputs and two active outputs. Depending on the amount of voltage at the junction of the two waveguides which carry the two input signals, the two inputs can be coupled to either of the two outputs. Several architectures have been proposed to construct an $N \times N$ switch with the $2 \times 2$ directional coupler as the basic component. These architectures are essentially analogs of similar architectures for electronic switching and interconnection networks. However, due to the difference in characteristics of the electronic and optical switching elements, performance of the optical architectures is significantly different.

Specifically, regeneration of signals in optical systems is difficult. This difficulty leads to the desire to reduce losses and eliminate noise sources so that the need for regeneration can be diminished. In light of this desire, some architectures that are useful when realized with electronics are less favored for optical realizations.

The attenuation of light passing through a waveguide optical coupler switch has several components: (a) fiber-to-switch and switch-to-fiber coupling loss, (b) propagation loss in the medium, (c) loss at waveguide bends, and (d) loss at the couplers on the substrate. Often, the last factor predominates and, therefore, a substantial part of the attenuation in a switch fabric is directly proportional to the number of couplers that the optical path passes through.

Optical crosstalk results when two signals interact with each other. There are two primary ways in which signals flowing in optical paths can interact in a planar substrate. First, the channels (waveguides) carrying the signals could cross each other in order to imbue a particular topology and the interaction occurs in the neighborhood of the crossover. Secondly, two paths sharing a switching element experience some undesired coupling from one path to the other. We call the former path crossover crosstalk, and the latter switch crossover crosstalk. The easiest way to reduce path crossover crosstalk is to reduce the size of the neighborhood within which the interaction occurs. This can be accomplished by keeping the intersection angles above a certain minimum amount. A more difficult approach is to make the interaction neighborhood precisely long enough to couple the signal entirely from one path to the other and back. With path crossover crosstalk reduced to a negligible level, switch crossovers remain as the major source of crosstalk in optical switching networks constructed out of electrooptic waveguide couplers.

The effort to reduce crosstalk is hence directed at the switch design, at the number of switches that a particular architecture requires in the optical path, and at the signal flow patterns within the network.

In the *IEEE Transactions on Communications*, Vol. COM-35, No. 12, December 1987, we published an article titled "Dilated Networks for Photonic switching". The article presents a number of networks where the third approach to reducing crosstalk is disclosed. We call this the dilated networks approach. Specifically, we disclosed a design for the Benes network that, while maintaining the rearrangeable non-blocking characteristic of the network, insures that no $2 \times 2$ switch in the network has optical signals applied concurrently to both its inputs. We also mentioned that a corresponding design for the Omega network is possible.

What we have not described, however, is a method for modifying the structure of any given network to create a corresponding network that is dilated.

SUMMARY OF THE INVENTION

In accordance with the principles of our invention, our method can be applied to any given switching network design that employs $2 \times 2$ switches the method yields a corresponding dilated switching network design. The dilated switching network differs from the original switching network in only two characteristics. First our dilated network guarantees that at no point in the network can two active signals concurrently appear at the two inputs (or two outputs) of a $2 \times 2$ switch. This eliminates crosstalk. Eliminating crosstalk extracts a price, however, and that price is the second difference between the networks. Specifically, the number of $2 \times 2$ switches in our dilated network (an corresponding connection links) is approximately twice the number of switches in the original network.

Our method calls for three steps: first, replacing each $2 \times 2$ switch with a dual rail switch that contains a pair of $2 \times 2$ switches; second, replacing each link that connects an output lead of one switch to an input lead of another switch with a pair of links that connect a pair of output links of one dual rail switch to a pair of input links of another dual rail switch; and third, combining pairs of output leads at the last stage of the network to form single output leads.

DETAILED DESCRIPTION

Figure 1:
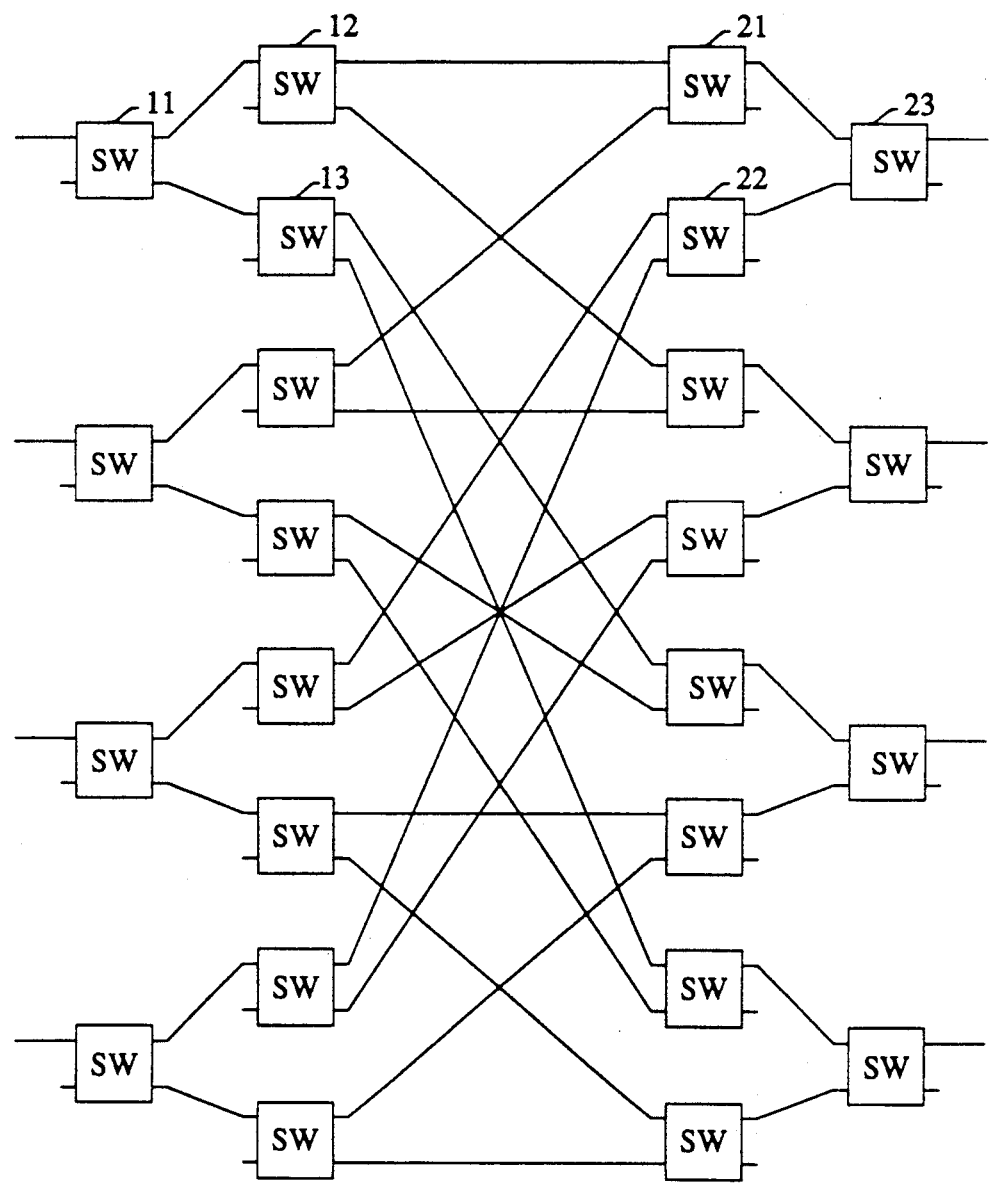
FIG. 1 illustrates a crossbar switch design using $2 \times 2$ switches.

The only condition on deriving a dilated version of a network is that no switch should concurrently carry two active signals, regardless of the permutation that is being realized. If every switch in the network has only one of its inputs connected, or only one of its outputs connected, then the network is dilated, by definition. We call such an implementation a "fan-in/fan-out" implementation. A fan-in-fan-out implementation of a four line crossbar is shown in FIG. 1. Elements 11, 12, and 13, for example, are one-to-two splitter elements. Though structurally they are $2 \times 2$ switches, each accepts an optical signal at only one input. As interconnected, they combine to develop four outputs. At any instant, no more than one of the four outputs can carry an optical signal. The four outputs of elements 12 and 13 are connected to two-to-one combiner elements such as element 21. Structurally, the combiner elements are also 2×2 switches, but they are arranged with the understanding that the control signals will insure that whatever optical signal is received at a combiner's input, it will be delivered to the combiner's selected output.

The disadvantage inherent in the fan-in/fan-out dilation of FIG. 1 is, of course, the large number of switches that is required. For an N×N crossbar, for example, the number of required 2×2 switches is 2N(N−1). This number is not the minimum number of switches with which an N×N network can be implemented. As shown in our aforementioned article by way of a counter example, we created a Benes network with a number of 2×2 switches on the order of $Nlog_2N$.

Neither the FIG. 1 architecture nor the Benes architecture are satisfactory for all applications. What would be useful, and what the instant invention offers, is the ability for artisans to select a particular network topology based on their specific set of system performance requirements, and then permit the developed network to be converted to a dilated realization. In accordance with the principles of our invention, a canonical implementation approach can be employed to achieve a dilated version of any interconnection network constructed from 2×2 switches.

Figure 2:
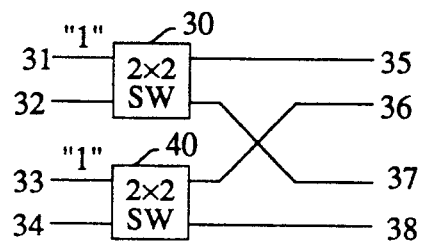
FIG. 2 presents our dual rail $2 \times 2$ switch.

Under the condition that no switching element carry at any instant an optical signal in both its input ports and/or both its output ports, the simplest switching function of two inputs is shown in FIG. 2. That is, in accordance with the principles of our invention, the FIG. 2 circuit is a direct substitute of a conventional 2×2 switch. Just as the conventional 2×2 switch has a "pass-thru" state and a "crossover" state, so does the circuit of FIG. 2. We call the arrangement of FIG. 2 a dual rail switch.

In FIG. 2, each of the two inputs signals is assumed to comprise two rails. One rail carries an active signal, while the other one does not. Each input pair (the two rails) is connected to a different 2×2 switch. In FIG. 2, one input pair is applied to input leads 31 and 32 of switch 30, while the other input pair is applied to input leds 33 and 34 of switch 40. As drawn, the active inputs (marked by "1") are at leads 31 and 33. Given that at most one of the two input leads of a 2×2 switch carry a signal, the switching state of switches 30 and 40 is well defined. Specifically, when the active signals are at the same spatial sense (i.e., leads 31 and 33 active or leads 32 and 34 active), then the states of switches 30 and 40 are reversed from one another. Conversely, when the active signals are at a crossed spatial sense (leads 31 and 34 active or leads 32 and 33 active) then the states of switches 30 and 40 are identical (i.e., both "crossover", or both "pass-thru"). A more detailed specification of the states of switches 30 and 40 is presented in the table below.

| input 31 | input 32 | input 33 | input 34 | connection type | switch 30 | switch 40 |
|---|---|---|---|---|---|---|
| 1 | 0 | 1 | 0 | pass thru | pass-thru | pass-thru |
| 1 | 0 | 1 | 0 | crossover | crossover | crossover |
| 1 | 0 | 0 | 1 | pass-thru | pass-thru | crossover |
| 1 | 0 | 0 | 1 | crossover | crossover | pass-thru |
| 0 | 1 | 1 | 0 | pass-thru | crossover | pass-thru |
| 0 | 1 | 1 | 0 | crossover | pass-thru | crossover |
| 0 | 1 | 0 | 1 | pass-thru | crossover | crossover |
| 0 | 1 | 0 | 1 | crossover | pass-thru | pass-thru |

Figure 3:
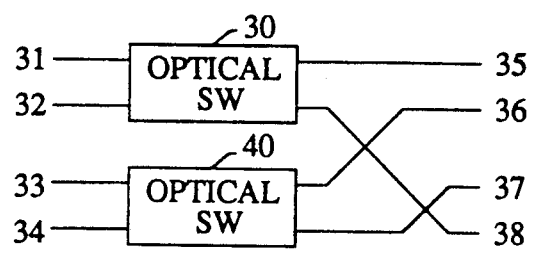
FIG. 3 presents a slight variation on the dual rail switch of FIG. 2.

FIG. 3 presents a variation on the dual rail switch of FIG. 2. Its only difference is in the spatial sense that the outputs exhibit for different spatial senses of the input. Specifically, the FIG. 3 dual rail switch forces the two output pairs to have a like spatial sense. Either the top rail of both output pairs is active, or the bottom rail of both output pairs is active.

In accordance with the principles of our invention, any network topology or architecture that employs 2×2 switches can be realized in a dilated form by (1) replacing the single rail 2×2 switches of the network with the dual rail switches of FIG. 2 (or FIG. 3), (2) interconnecting the dual rail switches with pairs of lines in a manner that essentially replaces the single line interconnections of the undilated network with line pairs, and (3) insuring with appropriate control signals as described above that each pair of lines has, at most, one lead that carries active signal information. The latter, of course, is an operational requirement rather than a structural one.

Figure 4:
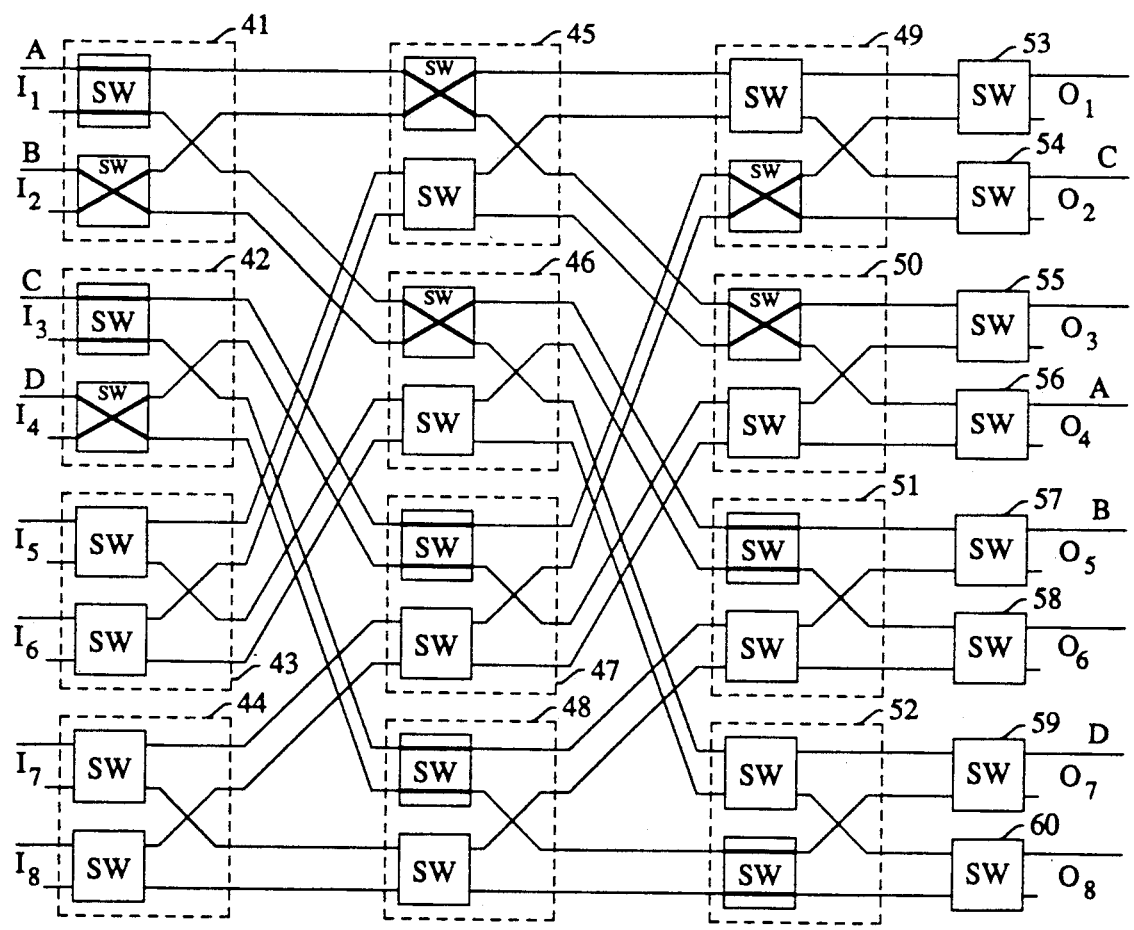
FIG. 4 shows a dilated switching network realization for the Omega network with 8 inputs and outputs.

FIG. 4 illustrates the use of our approach in connection with the network known as the omega network (with the input shuffle deleted for sake of simplicity). The dual rail switches are marked by dashed blocks 41-52. In blocks 41-44 only one input of each input pair is connected to the incoming signal. The other inputs are simply not used. This insures the first of the requirements for blocks 41-44; that of no more than one active input at each pair of inputs to each 2×2 coupler within the dual rail switch. The requirement that no pair of outputs should contain a signal in both of the output leads is satisfied by a judicious application of control signals to the couplers within the dual rail switches, as described above. The final stage of the network, which in the case of FIG. 4 is dual rail switches 49-52, the output pairs contain an active signal in only one of the leads. Each of the output pairs should be combined to a single output lead and, accordingly, FIG. 4 includes combiners 53-60 which serve this function. It may be noted that switches 41-44 could be constructed from switches that are simpler than the dual rail switch of FIG. 2. Conversely, the combiner switches 53-60 can be realized with the dual rail switches used elsewhere in the network. It is simply a designer's choice.

FIG. 4 depicts a very small network; only 8 inputs and outputs. Because of its small size, the connectivity pattern perhaps is not obvious from the figure itself but, of course, the omega network is well known in the art. Nevertheless, for the sake of completeness, the description below presents the connectivity pattern of the omega network in "closed form". The nomenclature developed for the omega network is also used in connection with other networks that are described infra.

The omega network is one of a class of networks that require $log_2N$ stages of switching elements for an N input and N output network. The connectivity of the switching elements can be described by designating each stage with a variable, such as i, ranging from 0 to $(log_2N)-1$. Each input and output lead of a stage is labeled from 0 to N (starting, for example, from the top of the figure), and the label is expressed in binary form. A specific input link is thus identified by $$I(p_{l-1}p_{l-2}p_{l-3}\cdots p_j \cdots p_2p_1p_0)_i,$$

where $l=\log_2 N$, i is the stage number and I designates the link as an input link. Similarly, a specific output link is identified by $$O(p_{l-1}p_{l-2}p_{l-3}\cdots p_j \cdots p_2p_1p_0)_i,$$

where O designates the link as an output link.

The connectivity pattern for the undilated omega network is $$O(p_{l-1}p_{l-2}p_{l-3}\cdots p_j \cdots p_2p_1p_0)_i \rightarrow I(p_{l-2}p_{l-3}\cdots p_j \cdots p_2p_1p_0p_{l-1})_{i+1},$$

where $\rightarrow$ designates a connection between the links identified on the two sides of the arrow. Note that it merely is a circular left shift.

The dilated omega network of our invention has twice as many links between the switching stages as there are in the undilated omega network. Accordingly, the link labels require an additional bit, $p_1$. The connectivity pattern of the dilated network is therefore, $$O(p_lp_{l-1}p_{l-2}p_{l-3}\cdots p_j \cdots p_2p_1p_0)_i \rightarrow I(p_{l-1}p_{l-2}p_{l-3}\cdots p_j \cdots p_2p_1p_0p_l)_{i+1}.$$

With respect to the above-mentioned control signals, the table describing the behavior of the FIG. 2 dual rail switch is couched in terms of the spatial sense of the incoming signals. However, it may be noted that the spatial sense of the signals throughout the remainder of the network is strictly a function of the route selected for the signal. Since the control circuitry is aware of the desired routing, the actual control signals of the couplers in each of the dual rail switches can easily be ascertained.

Expanding on the above, the control of networks that employ 2×2 switches can be external or embedded in the signals that flow through the network. Typically, for the latter approach the signals are arranged in packets that contain a fixed number of information bits, and each packet contains a header section which holds the destination address of the packet. That destination address controls the packet's routing. In some networks, the packets' destinations directly control the routing. In others, the routing is dependent on other packets. For example, in a Batcher network where each 2×2 switch is called upon to sort the two incoming packets, the destination address of both packets needs to be known before the state of the 2×2 switch can be determined.

Applications with external routing control typically relate to "circuit switching" situations. Circuit switching is used, for example, when a call is established from point A to point B and the call remains in effect for a relatively long period of time. Centralized external switching is also possible with packetized data. In such situations, the external circuitry (rather than the distributed control intelligence within each switch) develops the necessary routing signals. It is also possible for the external circuitry to mimic the routing algorithm that is otherwise implemented within the routing switches.

Indeed, in some applications it may be even advantageous to separate the routing control function from the actual routing of signals. For example, in waveguide electrooptic applications the routing control is electronic whereas the signals and the switching element are optic. Even though the bandwidth of the information signal modulated upon the optic carrier is very high, the packet rate may be quite reasonable for electronic implementations. Consequently, it is possible to create an electronic circuit that basically deals only with the address portions of each packet and evaluates the necessary routing control information. This electronic circuit can be centralized, or it can be distributed. Indeed, it can be distributed and appear identical in its interconnection of the distributed control circuitry portions to the network that it intends to control. We call this arrangement of the control circuitry, a "shadow network". With a shadow network arrangement, even sorting can be easily accomplished.

To illustrate the above control principles, FIG. 4 includes, by way of example, a particular interconnection pattern of four input signals to particular output ports; to wit, inputs A, B, C, and D at input ports $I_1$, $I_2$, $I_3$, and $I_4$, are to be connected to output ports $O_4$, $O_5$, $O_2$, and $O_7$, respectively. The figure also depicts the states of the relevant switches.

Figure 5:
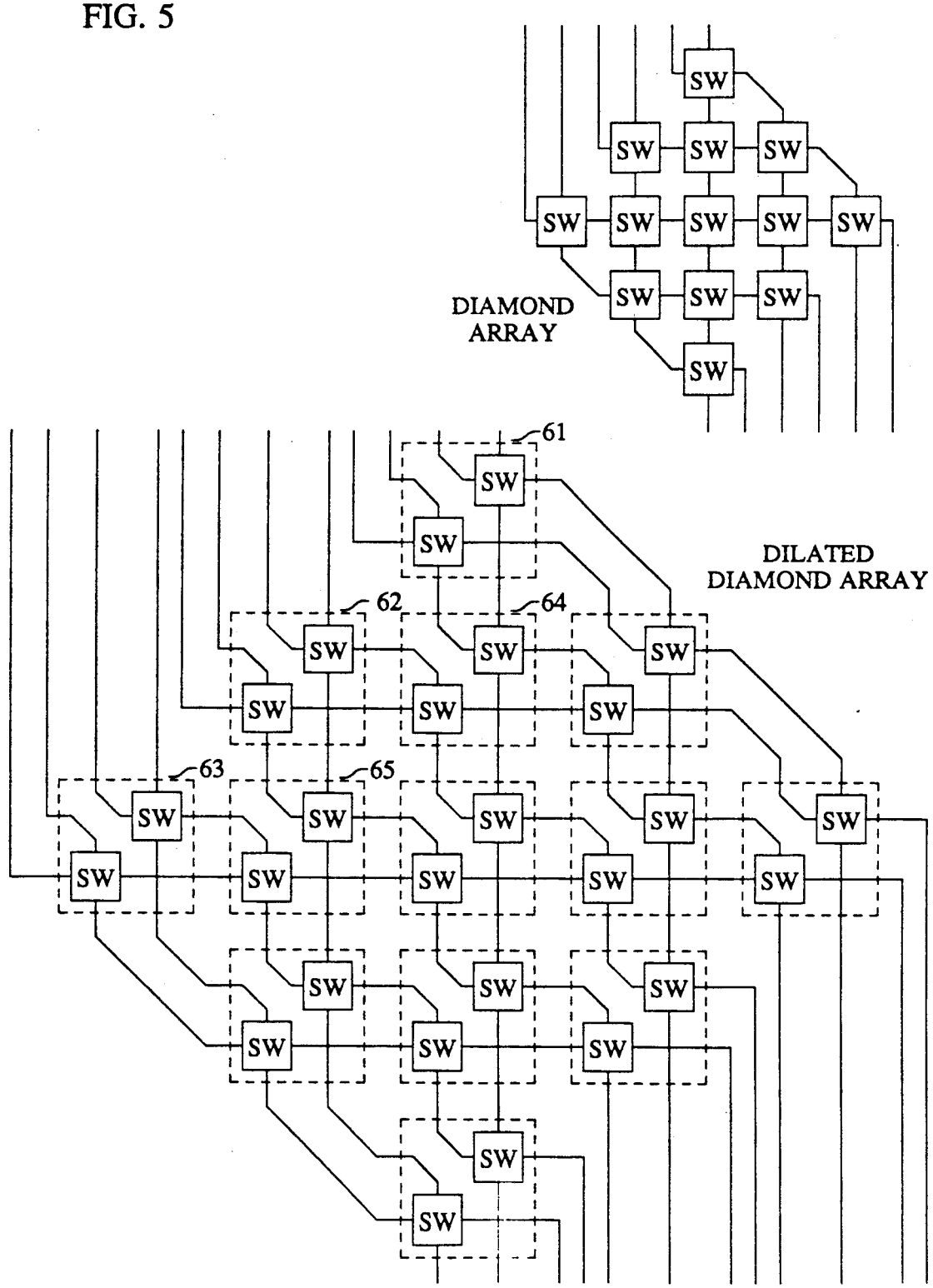
FIG. 5 shows an undilated and a dilated realization of a diamond array.

FIG. 5 presents the undilated and the dilated structures of the diamond array. In the dilated version, the inputs are applied to the dual rail switches that are situated at the top left diagonal; to wit, switches 61, 62, and 63. These switches, and the switches on the diagonal immediately below and to the right (i.e., switches 64 and 65) can be thought of as the i=0 stage. With such an arrangement, the input connections of the diamond array in the first stage (i=0) can be said to be:

(a) input signals are injected into input links 0, and 2 of stage O (two inputs in dilated switch 61), input links 8, and 10 of stage O (two inputs in dilated switch 62), and input links 16, and 18 of stage O (two inputs in dilated switch 63);

(b) output links 2-3 (switch 61) and 8-9 (switch 62) are connected to input links 4, 5, 6, and 7 of stage O (switch 64), and output links 10-11 (switch 62) and 16-17 of stage O (switch 63) are connected to input links 12, 13, 14 and 15 of stage O.

Output links 0, 1, 4, 5, 6, 7, 12, 13, 14, 15, 18 and 19 are connected to the next stage. Generalizing, the connectivity of the diamond array is not accounting for the edge links 0, 1, 18 and 19:

(1) $O(8n+j)_i$ for $j=0,1,2,3 \rightarrow I(8n+j-2)_i$ for all non-negative $8n+j-2$:

(2) $O(8n+j)_i$ for $j=4,5 \rightarrow I(8n+j-2)_{i+1}$; and (3) $(8n+j)_i$ for $j=6,7 \rightarrow I(8n+j+2)_{i+1}$.

Figure 6:
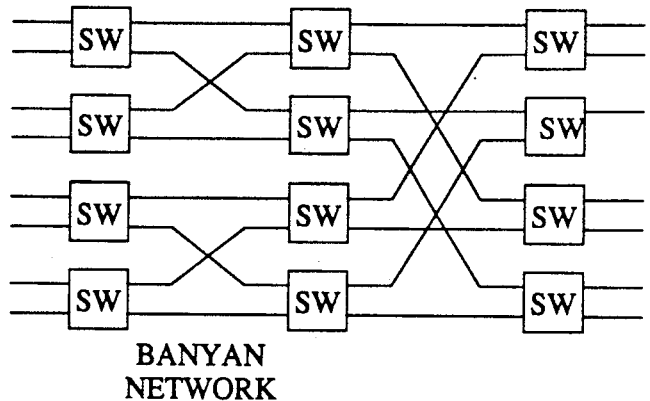
FIG. 6 shows an undilated and a dilated realization of a Banyan network.
Figure 6:
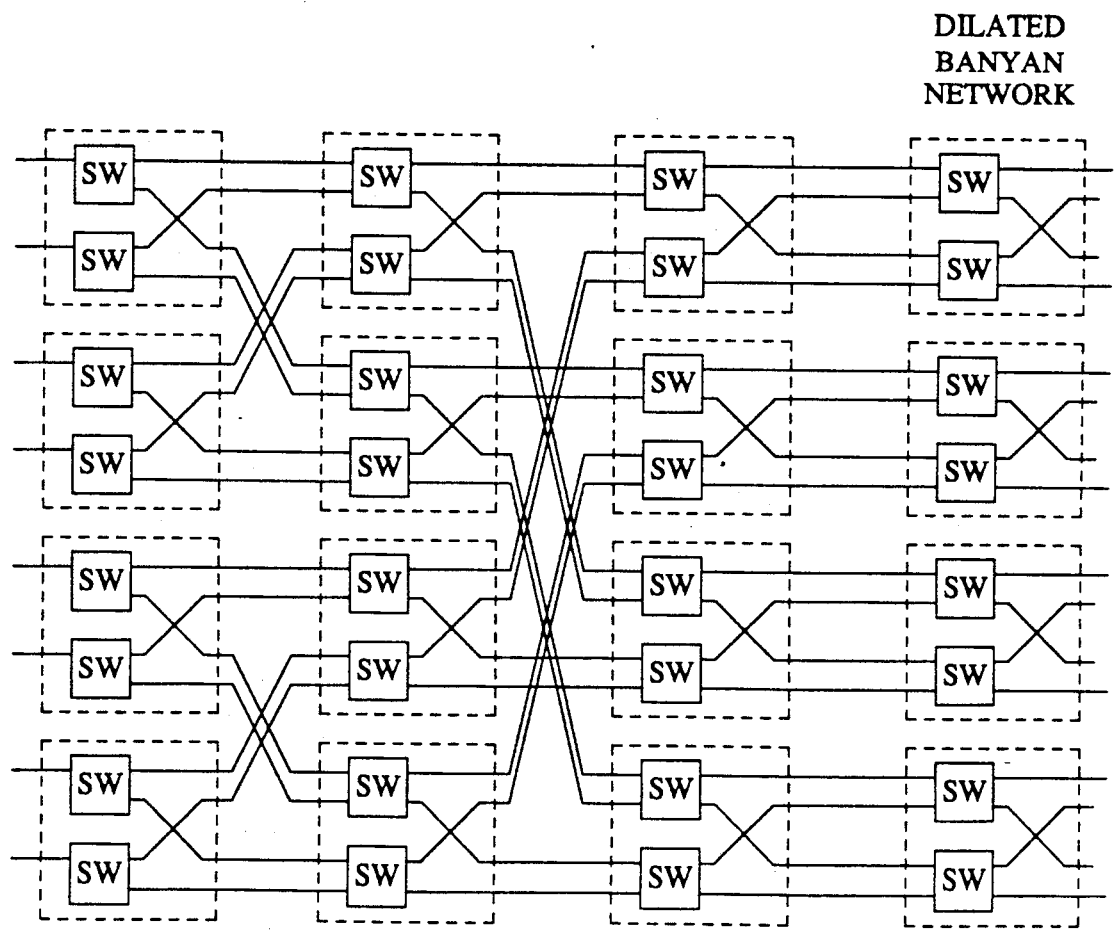

FIG. 6 depicts the undilated and the dilated structures of the banyan network. The connectivity pattern of the undilated network at any stage i is $O(P_{l-1}P_{l-2}\cdots P_{i+2}P_{i+1}\cdots P_1P_0)_i \rightarrow I(P_{l-1}P_{l-2}\cdots P_{i+2}P_0\cdots P_1P_{i+1})_{i+1}$. It is basically a swap of bits $P_0$ and $P_{i+1}$. In the dilated banyan, $O(P_lP_{l-1}\cdots P_{i+2}P_{i+1}\cdots P_1P_0) \rightarrow I(P_{N+1}P_N\cdots P_1P_{i+1}\cdots P_{i+2}P_0)$. In other words, a swap of bits $P_1$ and $P_{i+2}$.

Figure 7:
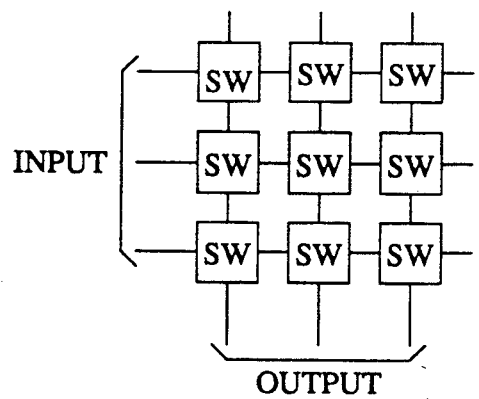
FIG. 7 shows an undilated and a dilated realization of a mesh-connected crossbar.
Figure 7:
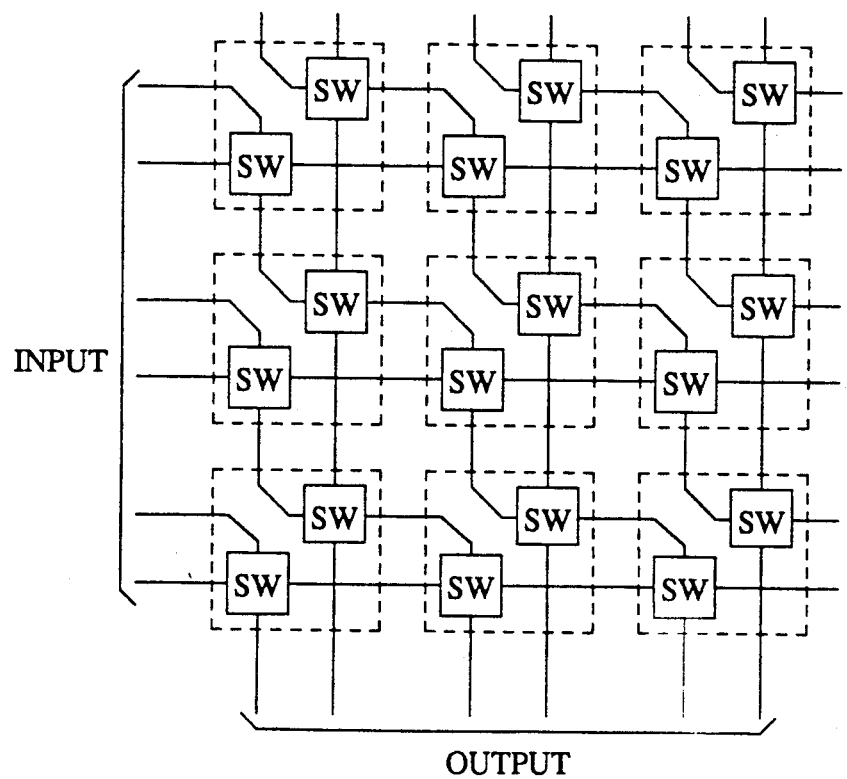

FIG. 7 illustrates the undilated and the dilated structures of the meshconnected crossbar network. The connectivity of the mesh-connected crossbar is most easily defined in terms of rows and columns. Each dilated switch has one pair of links connected to its neighbor in the same row, and one pair of links connected to its neighbor in the same column.

The above figures illustrate fully dilated networks, but a skilled artisan would clearly recognize that a partially dilated network can be easily obtained by simply implementing only a portion of a given network with dual rail switches. The simplest way to create a partially dilated network is to divide the given network into a dilated portion preceded by an undilated portion. It is simplest because no additional components are necessary. However, reversing the arrangements is not much more difficult. It merely requires the inclusion of a combining stage after the dilated portion and before the undilated portion.

We claim:

1. A method for creating an altered version of a given network that employs single rail 2×2 switches and includes single rail input signals and single rail output signals, comprising the steps of:

employing a dual rail switch in said altered version of a given network in place of a single rail switch in said given network, said dual rail switch comprising two input pairs of leads and two output pairs of leads;

employing a pair of links in said altered version of a given network in place of a single link in said given network; and employing a combiner stage as the ultimate stage of said altered version of a given network to combine pairs of output signals in a penultimate stage of said altered version of a given network to form single rail output signals of said altered version of a given network that parallel said single rail output signals of said given network.

2. The method of claim 1 further comprising a step of developing a set of control signals, said set comprising a pair of control signals for each of said dual rail switches, with each pair of control signals developed for a dual rail switch arranged to insure that no more than one of active signals applied to said dual rail switch is routed to each of said output pairs of leads of said dual rail switch.

3. A network for routing signals comprising:

a plurality of dual rail routing elements, each comprising a first pair of input leads, a second pair of input leads, a first pair of output leads and a second pairs of output leads;

a first interconnection arrangement wherein
   said first pair of input leads of one of said dual rail routing elements is connected to a pair of output leads of another one of said dual rail routing elements, and
   said second pair of input leads of said one of said dual rail routing elements is connected to a pair of output leads of still another one of said dual rail routing elements;

a plurality of single rail routing elements, each comprising one pair of input leads and one pair of output leads;

a second interconnection arrangement wherein said input leads of one of said single rail routing elements are connected to output leads of different ones of said single rail routing elements; and a combiner element interposed between each output pair of leads of dual rail switch that communicates the output signal of said output pair of leads to a single rail switch, with said combiner element having two inputs and one output.

4. The network of claim 3, wherein said combiner element performs a logical OR function.

5. the network of claim 3 wherein said combiner element performs a selection function.

6. A dilated omega network comprising
   a plurality of interconnected stages, where each stage comprises N 2×2 switches that include 2 input links and two output links each, N being an integer, the interconnection of said stage comprising links that connect switches in stage i to switches in stage i+1, where i is an integer, in accordance with the pattern $O(p_lp_{l-1}p_{l-2} \ldots p_j \ldots p_2p_1p_0)_i \rightarrow I(p_{l-1}p_{N-2} \ldots p_j \ldots p_2p_1p_0)_{i+1}$, where l is an integer such that $N \leq 2^l$, $p_k$ represents the k+1 bit in a binary representation of a designation of a link of a switch, where such designation is an integer in the range 0 to 2N and is twice the value of the designation of the switch, and $O(p_lp_{l-1}p_{l-2} \ldots p_j \ldots p_2p_1p_0)_i$ designates output link $(p_lp_{l-1}p_{l-2} \ldots p_j \ldots p_2p_1p_0)$ at stage i while $I(p_{l-1}p_{l-2} \ldots p_j \ldots p_2p_1p_1p_0)_{i+1}$ designates input link $(p_{l-1}p_{l-2} \ldots p_j \ldots p_2p_1p_1p_0)$ at stage i+1.

7. A dilated diamond array comprising a plurality of interconnected stages, where each stage comprises 2×2 switches that include 2 input links and two output links each, the interconnection of said stage comprising links that connect switches in stage i to switches in stage i+1, where i is an integer, in accordnace with the pattern
   (1) $O(8n+j)_i$ for $j=0,1,2,3 \rightarrow I(8n+j-2)_i$ for all non-negative 8n+j−2, where n is an integer, $O(8n+j)_i$ designates output link 8n+j in stage i and; $I(8n+j-2)_i$ designates input link 8n+j−2 in stage i;
   (2) $O(8n+j)_i$ for $j=4,5 \rightarrow I(8n+j-2)_{i+1}$ where $I(8n+j-2)_{i+1}$ designates input link 8n+j−2 in stage i+1; and
   (3) $(8n+j)_i$ for $j=6,7 \rightarrow I(8n+j+2)_{i+1}$ where $I(8n+j+2)_{i+1}$ designates input link 8n+j+2 in stage i+1.

8. A dilated banyan network comprising
   a plurality of interconnected stages, where each stage comprises N 2×2 switches that include 2 input links and two output links each, N being an integer, the interconnection of said stage comprising links that connect switches in stage i to switches in stage i+1, where i is an integer, in accordnace with the pattern $O(p_lp_{l-1} \ldots p_j+2p_{j+1} \ldots p_lp_0)_i \rightarrow I(p_lp_{l-1} \ldots p_j+2p_0 \ldots p_lp_{j+1})_{i+1}$, where l is an integer such that $N \leq 2^l$, $p_k$ represents the k+1 bit in a binary representation of a designation of a link of a switch, where such designation is an integer in the range 0 to 2N and is twice the value of the designation of the switch, and $O(p_lp_{l-1} \ldots p_j+2p_{j+1} \ldots p_lp_0)_i$ designates output link $(p_lp_{l-1} \ldots p_j+2p_{j+1} \ldots p_lp_0)$ at stage i while $I(p_lp_{l-1} \ldots p_j+2p_0 \ldots p_lp_{j+1})_{i+1}$ designates input link $(p_lp_{l-1} \ldots p_j+2p_0 \ldots p_lp_{j+1})$ stage i+1.

* * * * *